Nov. 15, 1932.  L. E. GRUBE ET AL  1,888,078
TURBINE INSTALLATION
Filed Sept. 19, 1929
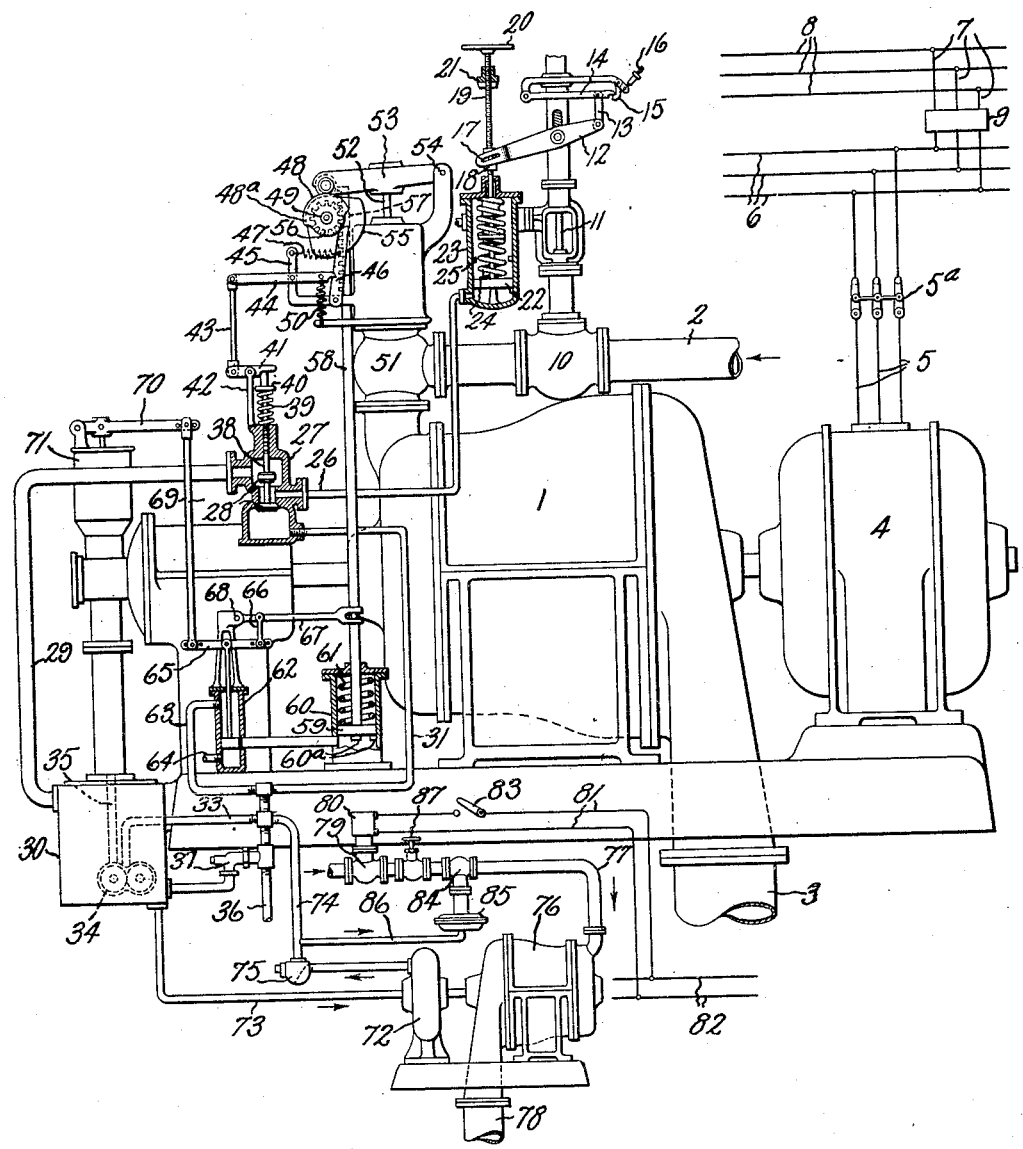
Inventors:
Lester E. Grube,
Franklin R. Ericson,
Donald F. Warner,
by Charles E. Tullar
Their Attorney.

Patented Nov. 15, 1932

1,888,078

UNITED STATES PATENT OFFICE

LESTER E. GRUBE AND DONALD F. WARNER, OF LYNN, AND FRANKLIN R. ERICSON, OF BEVERLY, MASSACHUSETTS, ASSIGNORS TO GENERAL ELECTRIC COMPANY, A CORPORATION OF NEW YORK

TURBINE INSTALLATION

Application filed September 19, 1929. Serial No. 393,824.

The present invention relates to elastic fluid turbine installations wherein there is provided an auxiliary or stand-by turbine driven generator set which normally carries no load and is utilized only in cases of emergency. Such a set is provided, for example, in power plants where auxiliaries, such as the condenser and feed water pumps and the like, are electric motor driven, deriving their power from house bus bars connected to the bus bars of the main generators, the set being utilized to supply power to the house bus bars in case the supply of power from the main generators fails. In some instances it is desirable to have such a turbine driven set shut down and to start it up and put it on the line when needed, while in other instances it is desirable to have the turbine driven set floating on the line, either passing sufficient steam through the turbine to keep it running idle or permitting the turbine to be driven by its generator, the generator thus functioning as a motor and being used, if desired, as a synchronous condenser for power factor correction purposes.

The object of our invention is to provide an improved turbine installation and control means whereby the turbine set may be utilized in either of the two ways mentioned and wherein in case the turbine is shut down it can be quickly and easily started, brought up to speed, and put on the line, and wherein in case it is floating on the line it is automatically caused to take on the load of the house bus bars if the frequency on such bus bars decreases below a predetermined low value.

For a consideration of what we believe to be novel and our invention, attention is directed to the accompanying description and the claims appended thereto.

In the drawing, the figure is a diagrammatic view of a turbo generator set equipped with an operating control means embodying our invention.

Referring to the drawing, 1 indicates an elastic fluid turbine of any suitable type having an admission conduit 2 and an exhaust conduit 3. The turbine is direct-connected to an alternating current dynamo electric machine 4 connected by lead lines 5 and a switch 5a to bus bars 6 which may be the house bus bars of a power station. House bus bars 6 are connected by conductors 7 to main bus bars 8, the conductors 7 including a suitable disconnecting switch 9 such as a reverse current circuit breaker. Connected to bus bars 8 are main generators (not shown) which fix the frequency of the system to which the dynamo electric machine 4 is connected. With this arrangement, turbine 1 may drive dynamo electric machine 4 to supply current to bus bars 6, or turbine 1 may run idle, the dynamo electric machine 4 running as a motor to drive the turbine, or the turbine may be shut down, the switch 5a being open.

In admission conduit 2 is an emergency shut-off or throttle valve 10 biased to closed position by suitable means such as its weight or a spring. The stem 11 of valve 10 is connected at an intermediate point to a lever 12, one end of which is connected by a link 13 to a trip lever 14. Trip lever 14 is normally held in latched position by a catch 15. Connected to catch 15 is a rod 16 which leads to the usual emergency speed governor of the turbine, the arrangement being such that in case the speed of turbine exceeds a predetermined high value latch 15 releases lever 14 and permits valve 10 to close. An emergency speed governor control means of this type is well known in connection with the operation of elastic fluid turbines and as its specific construction and arrangement forms no part of the present invention it is not illustrated in detail. The arrangement shown is to be taken as typical of any suitable means for tripping and effecting the closure of an emergency throttle valve. The other end of lever 12 is provided with furcations 17 having slots which engage pins on a nut 18. Nut 18 is arranged on a threaded stem 19 having a hand wheel 20 at its upper end. Below hand wheel 20 is a fixed guide 21 through which stem 19 passes loosely. When stem 19 is turned in one direction nut 18, since it cannot turn at the stem, will travel upward carrying the left hand end of lever 12 with it, while when the stem is turned in the other direction the nut will be forced to travel downward. By this means, the valve 10 may be opened and closed by means of hand wheel 20. The lower end of stem 19 is connected to a piston 22 located in a cylinder 23 forming a fluid actuated motor for automatically opening and closing valve 10. Arranged between piston 22 and the top of the cylinder is a spring 24 which tends normally to force piston 22 down in the cylinder. In the cylinder are stops 25 which limit upward movement of piston 22. When piston 22 is in the position shown in the drawing, valve 10 is closed, while when it is in a position in engagement with stops 25 valve 10 is opened, assuming that nut 18 is in the position shown in the drawing. At any time valve 10 may be closed or set in an intermediate position by means of hand wheel 20. Cylinder 23 beneath piston 22 is connected by a pipe 26 to a valve casing 27 in which is located a two-way valve 28. Arm 46 and lever 44 thus form a latch mechanism. When valve 28 is in the position shown in the drawing, pipe 26 is connected to a discharge pipe 29 which leads to the oil tank 30 of the turbine or other suitable discharge point. When the position of valve 28 is reversed by being forced downward then the connection of pipe 26 to discharge pipe 29 is closed and pipe 26 is connected by a pipe 31 and a pipe 33 to the pump 34 of the turbine. With this arrangement it will be seen that when the turbine is running and valve 28 is in the reversed position, oil will be supplied from pump 34 to the underside of piston 22 holding it in its upper position wherein it engages stops 25 and holds valve 10 open. Oil pump 34 is the usual oil pump which forms a part of the turbine structure, it being driven by the turbine shaft by means of a vertical shaft 35. In the present instance a gear pump of the usual type is illustrated. Gear pump 34 supplies oil also for the bearings and other parts of the turbine, the pipe for conveying oil to the bearings and other parts being indicated at 36. 37 is a spring pressed pressure relief valve of known type arranged in a pipe which leads from pipe 36 back to the oil tank 30 and serves to limit the pressure which can be established by pump 34.

The stem 38 of valve 28 projects outside the valve casing and is surrounded by a spring 39 which tends normally to force the valve upward to the position shown in the drawing, the spring being located between the top of the valve casing and a collar 40 fixed on the valve stem. Engaging with the top of stem 38 is one end of lever arm 41 pivoted on a fixed fulcrum 42. The other end of lever arm 41 is connected by a link 43 to one end of a lever 44 pivoted on a fixed arm 45. The other end of lever 44 is provided with a hook which engages a notch in a vertically extending arm 46 pivoted at its lower end. Arm 46 and lever 44 thus form a latch mechanism. Connected to the upper end of arm 46 is a spring 47 which tends to hold the arm 46 in engagement with lever 44. 48 indicates a cam carried by the cam shaft 49 of the controlling valve gear of the turbine. Cam 48 has an operating surface 48$^a$ and when the cam is turned in an anti-clockwise direction as viewed in the drawing, the operating surface engages the end of arm 46 moving it toward the right and releasing lever 44.

Connected to the right hand end of lever arm 44 is a spring 50, which spring is stronger than the spring 39 and serves, when the hook at the right hand end of lever 44 is released from its catch on arm 46, to turn lever 44 in a clockwise direction, thereby forcing the right hand end of lever 41 downward to reverse the position of valve 28.

In admission conduit 2 is a regulating valve means 51, the stem 52 of which is connected to an arm 53 pivoted at 54 on a fixed support. The free end of arm 53 carries a roller which rests on a valve operating cam 55 carried by cam shaft 49. When cam 55 moves in a counterclockwise direction it lifts the left hand end of arm 53, thereby opening valve 51, while when it moves in the opposite direction it permits valve 51 to close. This is a known type of valve gear for an elastic fluid turbine and is illustrated only in outline. It is to be taken as typical of any suitable turbine valve gear for controlling the flow of elastic fluid to a turbine. On cam shaft 49 is a toothed pinion 56 which meshes with a rack 57 on the upper end of a rod 58. The lower end of rod 58 is connected to a piston 59 located in a cylinder 60 and normally biased toward stops 60$^a$ at the lower end of the cylinder by a spring 61 arranged between the upper surface of the piston and the top wall of the cylinder. Connected to cylinder 60 is a pilot valve 62 which controls the flow of actuating fluid to the cylinder. The pilot valve is connected to gear pump 34 by a pipe 63 and the pipe 33. 64 indicates a discharge pipe for the pilot valve which may lead to any suitable point, for example back to the oil tank 30. The stem of the pilot valve is connected to a floating lever 65, one end of which is connected by a link 66 to a lever 67 pivoted at one end at 68 and connected at the other end to rod 58. The other end of floating lever 65 is connected by a link 69 to the governor lever 70 of a speed governor 71, driven from the shaft of the turbine in the usual way. The arrangement of the connections between speed governor 71 and the valve gear, which arrangement includes the fluid actuated motor illustrated, is a known one including a usual form of follow up connection, the operation of which is well understood.

In connection with the mechanism we provide an auxiliary source of fluid pressure supply comprising an oil pump 72 having its inlet end connected by a pipe 73 to the oil supply tank 30, and its discharge outlet connected by a pipe 74 to pipe 33. In pipe 74 is a non-return or check valve 75 which serves to prevent the flow of oil through pipe 74 back toward pump 72. Connected to pump 72 for driving it is an elastic fluid turbine 76, pump 72 being shown in the present instance as being a rotary pump. Elastic fluid is supplied to turbine 76 through an admission conduit 77 which may lead from any suitable source of supply. The exhaust conduit for turbine 76 is indicated at 78. In conduit 77 is a valve 79 which is controlled by an electromagnet 80, the arrangement being such that when electromagnet 80 is energized the valve 79 is opened, while when the electromagnet is de-energized the valve is closed, suitable means, such as a spring (not shown) being provided for biasing the valve toward closed position. Electromagnet 80 is arranged in a suitable electric circuit comprising conductors 81 which lead to a source of electrical supply indicated 82, and which include a manually operated switch 83. In admission conduit 77 is a second valve 84 which is biased normally to open position by suitable means such as a spring (not shown), the stem of the valve being connected to a diaphragm located in a casing 85. The underside of the diaphragm is connected by a pipe 86 to pipe 74. With this arrangement valve 84 is normally open, but is closed whenever the pressure in pipe 74 exceeds a predetermined high value. In conduit 77 is also a suitable hand valve 87.

The operation of the system under the two conditions for its operation, that is, the condition wherein the turbine is shut down and is brought up quickly to speed when needed, and the condition wherein the turbine is floating on the line being driven by the dynamo-electric machine 4, is as follows:

Under the first condition of operation turbine 1 is shut down and switch 5ª is open so that dynamo-electric machine 4 is disconnected from the bus bars 6. Also, the hook on the end of lever 44 is released from the notch on arm 46 so that spring 50 pulls down the right hand end of lever 44, thereby reversing the position of valve 28 from that shown in the drawing. Also, since the turbine is standing still, the pilot valve will have been moved down by the speed governor so that it uncovers the connection of the pilot valve to the cylinder 60. If now it is desired to start turbine 1, switch 83 is closed, whereupon electromagnet 80 is energized, opening valve 79 and admitting elastic fluid to turbine 76. Turbine 76 is a small machine capable of quickly coming up to speed, and as soon as elastic fluid is admitted to it pump 72 will supply oil through pipe 74, pipe 31, past valve 28, and pipe 26 to cylinder 23, whereupon piston 22 will be raised, opening valve 10. At the same time oil will be supplied past pilot valve 62 to cylinder 60, raising piston 59 to effect the opening of valve 51. Elastic fluid is thus admitted to turbine 1 to start the same, and as soon as it comes up to speed it operates under control of its speed governor 71. As soon as turbine 1 is up to speed, dynamo-electric machine 4 is put on the line by closing switch 5ª. Pump 72 supplies oil at a somewhat lower pressure than does the gear pump 34 when the turbine is up to speed, and as soon as the turbine is up to speed so that pump 34 begins to supply oil under pressure, such pressure acting on the diaphragm in casing 85 forces it upward to effect the closing of valve 84, thereby automatically shutting down turbine 76. In so far as the starting of the turbine 1 is concerned, it will be seen that the operator has only to close the switch 83 and then when the turbine is up to speed, close the line switch 5ª. By this means the turbine can be quickly started and placed on the line.

If, when starting up, the hook on the end of lever 44 is in engagement with the notch on lever 46, as shown in the drawing, so that valve 28 is in the position shown in the drawing and the turbine is started up under these conditions, the turning of cam shaft 49 in effecting the opening of valve 51 will bring cam 48 into engagement with the end of arm 46, thereby moving the upper end of arm 46 toward the right to release lever 44 and permit spring 50 to reverse the position of valve 28. This operation takes place very quickly so that if, when shutting down the turbine, the operator fails to manually release lever 46, still when switch 83 is closed fluid pressure will be admitted to open both valves 51 and 10, only valve 51 will be opened just prior to the opening of valve 10.

Under the second condition of operation wherein the turbine is floating on the line, dynamo-electric machine 4 being connected to the line and operating as a motor, valve 10 will be closed, piston 22 being in the position shown in the drawing. The hook on the end of lever 44 will be in engagement with the notch in arm 46 so that valve 28 is held in its upper position as shown in the drawing, connecting pipe 26 to discharge pipe 29 and disconnecting it from the source of fluid pressure supply from gear pump 34 which is now operating since the turbine is running at synchronous speed. Valve 51 will be open a certain amount corresponding to the speed at which the turbine is running and the setting of speed governor 71. Turbine 76 will be shut down, valve 84 being held closed by the fluid pressure from pump 34. Cam 48 is positioned on cam shaft 49 so that when valve 51 occupies an open position corresponding to synchronous speed, its operating surface 48ᵃ is spaced away from the end of arm 46. If now for any reason the frequency on the line begins to decrease, which means that the speed at which turbine 1 is operating decreases, speed governor 71 will effect a movement of the valve gear comprising valve 51 and its operating means toward open position since with decrease in speed the speed governor will tend to open valve 51. This effects an upward movement of piston 59 in cylinder 60 and a turning of cam shaft 49 in an anti-clockwise direction as viewed in the drawing. As soon as the speed decreases by a predetermined amount, the operating surface 48ᵃ of cam 48 will engage arm 46, moving it so that the hook at the right hand end of lever 44 is released. This permits spring 50 to turn lever 44 in a direction to reverse the position of valve 28. When the position of valve 28 is reversed, fluid pressure flows from gear pump 34 through pipes 33, 31 and 26 to the lower end of cylinder 23 with the result that piston 22 is raised against the action of spring 24 to open valve 10. As soon as valve 10 is opened, elastic fluid is admitted to turbine 1 and it immediately takes up load under control of its speed governor 71. Turbine 1 then drives the dynamo-electric machine 4 as a generator to supply current to the house bus bars. Under this condition of operation, the arrangement may be such that circuit breaker 9 is operated to disconnect the house bus bars from the main bus bars 8. The cam 48 is adjustable on shaft 49 and may be set to trip arm 46 to effect opening of valve 10 when the speed of the turbine is decreased by the desired amount, that is to say when the frequency of the line decreases a predetermined amount below its normal value.

By this invention it will be seen that there is provided an arrangement whereby the turbine may be operated efficiently in either of two ways. When the turbine is shut down it can be quickly brought up to speed and put on the line without attention on the part of the operator other than that of closing the hand switch to start up the oil pump and then closing the line switch of the dynamo-electric machine. The hand switch 83 may be located at the switch board of the power station or at any other convenient point.

When the turbine set is operated floating on the line it can be arranged to automatically take on load whenever the frequency drops to a predetermined value below normal and this without any attention or act on the part of the operator. Since the supply of elastic fluid to turbine 1 is normally shut off by the valve 10 the speed governor 71 may be set at any desired value, it being unnecessary to set it at a speed higher than synchronous speed in order to keep the valve 51 closed. This means that the speed governor 71 may be set so that when turbine 1 takes on load it will be operated at approximately normal speed.

What we claim as new and desire to secure by Letters Patent of the United States, is:

1. The combination with an elastic fluid turbine having an emergency trip valve and regulating valve means for controlling the admission of elastic fluid to the turbine, of a speed governor for the turbine, a fluid actuated motor for opening said emergency trip valve and another fluid actuated motor for opening said regulating valve means, and means for supplying fluid to the motors to cause opening of the trip valve and the regulating valve for starting the turbine.

2. The combination with an elastic fluid turbine having an emergency trip valve, a motor for moving the valve, regulating valve means for controlling the admission of elastic fluid to the turbine, of a speed governor driven by the turbine for regulating the admission of elastic fluid through the regulating valve means, and means associated with the regulating valve means for opening the emergency trip valve to start the turbine, said last named means comprising a valve for supplying fluid under pressure to the motor.

3. The combination with an elastic fluid turbine having an emergency trip valve and regulating valve means for controlling the admission of elastic fluid to the turbine, of a speed governor for the turbine, means controlled by the speed governor for maintaining the regulating valve means open when the turbine is running idle comprising a fluid actuated motor and means for supplying fluid to the motor, and means associated with the regulating valve means for opening the emergency trip valve when the speed of the turbine drops below a certain value.

4. The combination with an elastic fluid turbine having an emergency trip valve and regulating valve means for controlling the admission of elastic fluid to the turbine, of a speed governor for the turbine, means controlled by the speed governor for maintaining the regulating valve means open while the turbine is driven at a predetermined speed, a latch mechanism associated with the speed governor and a reversing valve under the control of the latch mechanism, said latch mechanism causing reversing of the reversing valve to open the emergency trip valve when the speed of the turbine drops below a definite value, the turbine then operating under control of the speed governor.

5. The combination with an elastic fluid turbine having an emergency trip valve and regulating valve means for controlling the admission of elastic fluid to the turbine, of a speed governor for the turbine, and fluid pressure means for opening said valve and valve means simultaneously for starting the turbine.

6. The combination with an elastic fluid turbine having an emergency trip valve and regulating valve means for controlling the admission of elastic fluid to the turbine, of a speed governor which normally controls the regulating valve means, a source of fluid pressure, fluid actuated means for opening said trip valve and said valve means, a control valve for admitting fluid under pressure to the actuating means for the emergency trip valve, and means associated with said regulating valve means for actuating said control valve.

7. The combination with an elastic fluid turbine having an emergency trip valve and regulating the valve means for controlling the admission of elastic fluid to the turbine, of a speed governor which normally controls the regulating valve means, actuating means for opening each of the valve means, control means comprising a reversing valve for controlling the actuating means for the emergency trip valve means, and means associated with said regulating valve means for actuating said control means.

8. The combination with an elastic fluid turbine having an emergency trip valve and regulating valve means for controlling the admission of elastic fluid to the turbine, of a speed governor for controlling the regulating valve means, and fluid actuated means for opening said emergency trip valve and said regulating valve means to start the turbine.

9. The combination with an elastic fluid turbine having an emergency trip valve, regulating valve means for controlling the admission of elastic fluid to the turbine, of a speed governor driven by the turbine for regulating the admission of elastic fluid through the regulating valve means, and means controlled by the regulating valve means for opening the emergency trip valve to start the turbine.

10. The combination with an elastic fluid turbine having an emergency trip valve and regulating valve means for controlling the admission of elastic fluid to the turbine, of a speed governor for the turbine, means controlled by the speed governor for maintaining the regulating valve means open when the turbine is running idle, and means associated with the regulating valve means for opening the emergency trip valve when the speed of the turbine drops below a certain value.

11. The combination with an elastic fluid turbine having an emergency trip valve and regulating valve means for controlling the admission of elastic fluid to the turbine, of a speed governor for the turbine, means controlled by the speed governor for maintaining the regulating valve means open while the turbine is driven at a predetermined speed, and means to open the emergency trip valve when the speed of the turbine drops below a definite value, the turbine then operating under the control of the speed governor.

12. The combination with an elastic fluid turbine having an emergency trip valve and regulating valve means for controlling the admission of elastic fluid to the turbine, of a speed governor which normally controls the regulating valve means, actuating means for opening each of the valve means, control means for controlling the actuating means for the emergency trip valve means, and means associated with said regulating valve means for actuating said control means.

13. The combination with an elastic fluid turbine having an emergency trip valve and regulating valve means, of means including a speed governor for maintaining the regulating valve means in open position while the turbine is running idle, and means for automatically opening the trip valve when the speed of the turbine reaches a certain predetermined value.

14. The combination with an elastic fluid turbine having an emergency trip valve and regulating valve means, of a speed governing mechanism for maintaining the regulating valve means in open position while the turbine is running idle, a motor for moving the trip valve, and means under control of the speed governing mechanism for causing operation of the motor when the speed of the turbine reaches a certain predetermined value.

15. The combination with an elastic fluid turbine having an emergency trip valve and regulating valve means, of a speed governing mechanism for maintaining the regulating valve means in open position while the turbine is running idle, a hydraulic motor for moving the trip valve, means including a reversing valve for supplying actuating fluid to the motor, and means under control of the speed governing mechanism for causing reversing of the reversing valve to permit actuating fluid to be supplied to the motor when the speed of the turbine reaches a predetermined value.

16. The combination with an elastic fluid turbine having an emergency trip valve and regulating valve means, of a speed governing mechanism for maintaining the regulating valve means in open position while the turbine is running idle, a hydraulic motor for moving the trip valve, means including a reversing valve for supplying actuating fluid to the motor, means under control of the speed governing mechanism for causing reversing of the reversing valve to permit actuating fluid to be supplied to the motor when the speed of the turbine reaches a predetermined value, the actuating fluid supply means also including a pump, a conduit for connecting the pump to the reversing valve, auxiliary oil supply means connected to the conduit, and means for operating the auxiliary oil supply means in terms of fluid pressure conditions in the conduit.

In witness whereof, we have hereunto set our hands this seventeenth day of September, 1929.

LESTER E. GRUBE.
DONALD F. WARNER.
FRANKLIN R. ERICSON.